(12) United States Patent
Colon et al.

(10) Patent No.: US 12,339,944 B2
(45) Date of Patent: *Jun. 24, 2025

(54) DIRECT ACCESS AUTHENTICATION USING GESTURES

(71) Applicant: TRUIST BANK, Charlotte, NC (US)

(72) Inventors: Reinaldo Gamaliel Rivera Colon, Raleigh, NC (US); Everardo Calamaco, Jr., Louisburg, NC (US); Michaela Rose Cestari, Cary, NC (US); Jeffrey Jason Griffin, Garner, NC (US)

(73) Assignee: Truist Bank, Charlotte, NC (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/494,140

(22) Filed: Oct. 25, 2023

(65) Prior Publication Data

US 2024/0061924 A1    Feb. 22, 2024

Related U.S. Application Data

(63) Continuation of application No. 17/856,077, filed on Jul. 1, 2022, now Pat. No. 11,836,239, which is a continuation of application No. 16/998,017, filed on Aug. 20, 2020, now Pat. No. 11,475,118.

(60) Provisional application No. 62/889,735, filed on Aug. 21, 2019.

(51) Int. Cl.
| | |
|---|---|
| *G06F 21/00* | (2013.01) |
| *G06F 3/0483* | (2013.01) |
| *G06F 3/04883* | (2022.01) |
| *G06F 21/36* | (2013.01) |
| *G06V 30/32* | (2022.01) |
| *H04L 9/40* | (2022.01) |

(52) U.S. Cl.
CPC ............ *G06F 21/36* (2013.01); *G06F 3/0483* (2013.01); *G06F 3/04883* (2013.01); *G06V 30/32* (2022.01); *H04L 63/08* (2013.01); *H04L 63/10* (2013.01)

(58) Field of Classification Search
CPC ........ G06F 21/36; G06F 30/32; G06F 3/0483; G06F 3/04883; H04L 63/08; H04L 63/10
See application file for complete search history.

(56) References Cited

U.S. PATENT DOCUMENTS

| | | | |
|---|---|---|---|
| 8,970,348 B1 * | 3/2015 | Evans | G06F 21/32 340/5.83 |
| 10,223,517 B2 * | 3/2019 | Kandekar | G06F 21/36 |
| 10,638,096 B1 * | 4/2020 | Lin | G08B 13/19656 |
| 11,475,118 B2 * | 10/2022 | Colon | H04W 12/33 |
| 11,586,249 B2 * | 2/2023 | Sim | G06F 3/0481 |
| 2014/0075548 A1 | 3/2014 | Sampathkumaran | |
| 2016/0292410 A1 * | 10/2016 | Lu | G06F 3/0488 |

(Continued)

FOREIGN PATENT DOCUMENTS

WO    WO-2012088474 A2 *    6/2012    ............. G06F 21/36

*Primary Examiner* — Khai M Nguyen
(74) *Attorney, Agent, or Firm* — Kilpatrick Townsend & Stockton LLP; Michael A. Springs, Esq.

(57) ABSTRACT

In some examples, a computing device can receive information about different gestures and output different application pages of an application, depending on the type of gesture associated with the information received. Mappings can be used to determine the application page to output a command to display, based on the gesture.

20 Claims, 9 Drawing Sheets

(56) References Cited

U.S. PATENT DOCUMENTS

2018/0074693 A1\* 3/2018 Jones ................... H04M 1/236
2020/0304626 A1 9/2020 Phillips et al.
2022/0027446 A1\* 1/2022 Van Os ................ G06V 40/67
2022/0335115 A1\* 10/2022 Colon ................ G06F 3/04883

\* cited by examiner

DIRECT ACCESS AUTHENTICATION USING GESTURES

CROSS-REFERENCE TO RELATED APPLICATIONS

This is a continuation of U.S. Ser. No. 17/856,077, filed Jul. 1, 2022 and titled "Direct Access Authentication Using Gestures," which is a continuation of U.S. Ser. No. 16/998,017, filed Aug. 20, 2020 (now U.S. Pat. No. 11,475,118) and titled "Direct Access Authentication Using Gestures," which claims priority to U.S. Ser. No. 62/889,735, filed Aug. 21, 2019 and titled "Direct Access Authentication Using Gestures," the entire contents of each of which are incorporated herein by reference.

TECHNICAL FIELD

The present disclosure relates generally to user authentication for computer systems, and more particularly (but not exclusively), to various authentication techniques and combinations of such techniques to securely authenticate users via mobile devices and provide direct access to specific features and resources.

BACKGROUND

Authentication is a function of modern-day computer systems that can be used for a wide variety of applications. For example, users may request to access bank accounts, tax records, or other secure, confidential information from mobile computing devices. Due to the confidential nature of the information requested, the user may be authenticated before being granted access to the information. Authentication may involve determining the user is an owner of the information or is entitled to access the information.

Authentication has historically involved passwords. The owner of the information may set up a password-protected account that may include confidential information with a service provider. The user may, at a later point, attempt to access the account to view the confidential information, and the service provider may authenticate the user, based on a successful password input from the user, and allow the user to view the confidential information. Two-factor authentication, in which two authentication methods are involved, can provide extra security for confidential information. But, in our modern world, users may desire authentication methods that may be quicker and more secure than existing technologies.

SUMMARY

In some examples, a computing device includes a processing unit and a computer-readable memory. The processing unit includes one or more processors. The computer-readable memory includes instructions that are executable by the processing unit to cause the computing device to perform operations. The operations can include receiving a request to access an application via the computing device. The application includes application pages. In response to receiving the request to access the application, the operations can include outputting a command to present a user interface via a display screen. The operations can also include receiving information about a gesture from a user. The operations can also include determining a specific application page among the application pages to present to the user based on the gesture from the user by accessing mappings between the application pages of the application and corresponding gestures, and by identifying the specific application page as corresponding to the gesture via a mapping. The operations can also include outputting a command to present the specific application page to the user via the display screen. The specific application page is a first application page. The operations can also include receiving information about a subsequent gesture from the user. The operations can also include determining a second application page of the application pages, that is different from the first application page, to present to the user based on the subsequent gesture from the user by accessing the mappings between the application pages of the application and the corresponding gestures. The operations can also include outputting a subsequent command to present the second application page to the user via the display screen.

DETAILED DESCRIPTION

Figure 1:
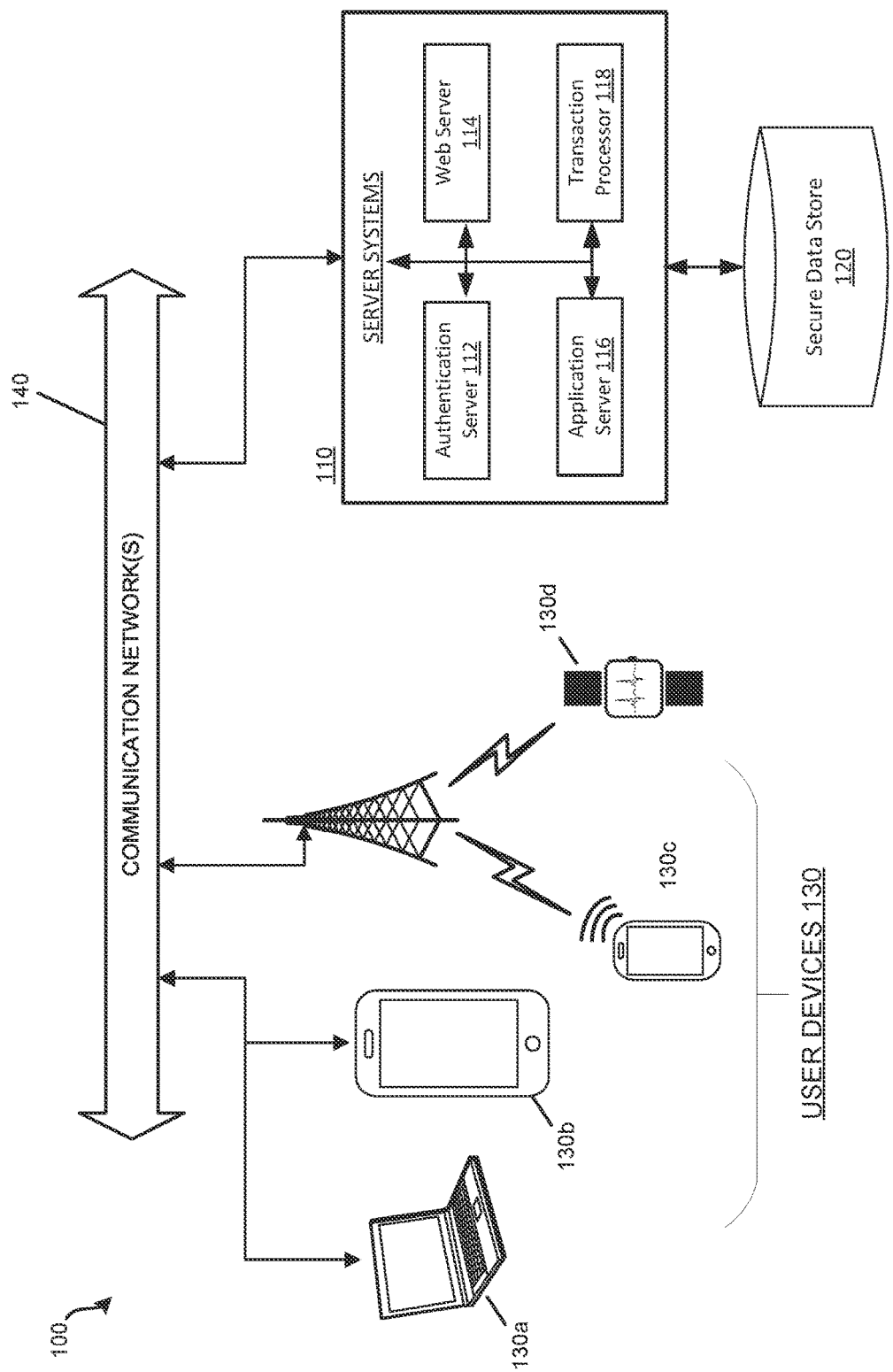
FIG. 1 is a schematic of a network environment in which gestures can be used to authenticate users and automatically navigate to desired pages for the users, according to one aspect of the present disclosure.

Certain aspects and features relate to receiving gestures as inputs to an authentication system that can authenticate a user via a gesture for an application and determine functionality to provide to the user inputting the gesture. A gesture, such as a physical movement by a body part of the user or a physical feature of the user, can be detected by a user device. The gesture can be verified by comparing the gesture to a mapping of the gesture to an approved gesture for authentication and to a particular page of function available for the application. The mapping can be stored by the authentication system or by a user device (e.g. a mobile computing device), and the user can designate the mapping. Designating the mapping may involve, for example, a user associating a swipe gesture with accessing a bank account; the user may create a mapping between the swipe gesture and accessing the bank account, the mapping being stored on the authentication system or the user device. Subsequent to successfully verifying the gesture, the user can be authenticated and can be allowed to access the application and the page associated with the gesture can be automatically served to the user device.

Users may be authenticated using username and password combinations, biometric features, out-of-wallet question and answer, or one-time passwords. These authentication processes, while often effective, can involve delays in the amount of time for authenticating the user and providing the user with access to a desired function or page in the application. And, for particularly sensitive data such as ebanking information, additional layers of authentication processes may be desired. For example, subsequent to an authentication process, applications require a user to navigate to a desired function or page in the application. By using gestures for both authenticating a user and automatically navigating to a desired page or function, less processing time can be used for navigating in the application and authenticating the user, and users are able to complete desired functions faster.

In the following description, for the purposes of explanation, specific details are set forth in order to provide a thorough understanding of various implementations and examples. Various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or most of the processing units can be implemented using customized circuits, such as Application Specific Integrated Circuits (ASICs), or Field programmable gate arrays (FPGAs).

FIG. 1 is a schematic of a network environment 100 in which gestures can be used to authenticate users and automatically navigate to desired pages for the users according to one aspect of the present disclosure. Included in the network environment 100 are user devices 130, one or more communication networks 140, and a server system 110. The user devices 130 may request and access resources within the server system 110 over one or more communications networks 140. The network environment 100 may correspond to Wide Area Network ("WAN") environment, such as the Internet, through which user devices 130 may communicate with servers via web browsers or client-side applications, to establish communication sessions, request and receive web-based resources, and access other features of the backend applications or services.

The server system 110 may be communicatively coupled to a data store 120 through one or more networks. Server system 110 may be or include any type of server including, for example, a rack server, a tower server, a miniature server, a blade server, a mini rack server, a mobile server, an ultra-dense server, a super server, or the like. The server system 110 and may include various hardware components, for example, a motherboard, a processing units, memory systems, hard drives, network interfaces, power supplies, etc. Server system 110 may include one or more server farms, clusters, or any other appropriate arrangement or combination or computer servers. Additionally, server system 110 may act according to stored instructions located in a memory subsystem of the server system 110, and may execute an operating system or other applications.

The server system 110 also may implement several different applications and services, and perform additional server-side functionality, including by an authentication server 112, web server 114, application server 116, and a backend transaction processor 118. For example, in implementations of banking or financial services systems, electronic commerce systems, and the like, the web-based resources provided by web server 114 or applications supported by application server 116 may be used by user devices 130 to access account information and perform application functions related to multiple accounts. The data store 120 may store any information necessary for the server system 110 to implement any functions of an application in relation to account access and permissions. In some examples, the server system 110 and data store 120 can be a single computing device that implements an application and stores user account information.

The data store 120 can include a profile of the known devices and behaviors of each user for each account provided by a certain application. For example, a single user may have two accounts for a particular application. The user may typically use a desktop computer to access information related to a first account, while more often use a mobile device 130 to access information related to the second account. The data store 120 may record these user activity observations over time as a user profile for the server system 110 to use in determining if any anomalous behavior occurs during further login attempts. For example, if the user attempts to access the first account using the mobile device, the confidence score of the successful login, as determined by the server system 110, may be of a lower score than what would typically be given to the user. The data store 120 also may include a set of defined rules configurable by the user or entity providing the account services. As another example, an entity maintaining the server system 110 and data store 120 may establish broad rules across user accounts that involve additional user verification when a confidence score is below a threshold value.

The user devices 130, which can be any number, can be capable of accessing and establishing communication sessions with the server system 110 and the data store 120 through the communication networks 140. As shown in this example, user devices 130a-130d correspond to mobile devices, including laptops 130a, tablet computers 130b, smartphones 130c, and smart watches 130d, which may access the server system 110 via a Local Area Network ("LAN") or Wide Area Network (WAN), as well as mobile telecommunication networks, short-range wireless networks, or various other communication network types (e.g., cable or satellite networks). Although certain examples herein are described in terms of mobile devices 130, it should be understood that other types of user devices 130, including both mobile and non-mobile devices, may be used in various embodiments. However, some embodiments herein include user gestures that are received as input via user devices 130, and thus, in such examples, user devices 130 may be capable of receiving user gestures via touchscreens or other input components.

Users operating various user devices 130 may attempt to gain access to the various resources provided by server system 110, including accounts, web-based applications, web-based resources and services, application features and functionality, as well as the underlying data stores 120 maintained by the server system 110. In response to requests from user devices 130, the authentication server 112 may attempt with verify the current user of the requesting device 130 with a sufficient degree of confidence, and that the current user has sufficient authorization credentials to perform the requested functionality.

Further, although certain components are shown in FIG. 1, any number of compatible network hardware components and network architecture designs may be implemented in various embodiments to support communication between the server system 110, data store 120, and various user devices 130. Such communication network(s) may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth™, Near Field Communication (NFC), and the like. Merely by way of example, the network(s) connecting the user devices 130 and server system 110 in FIG. 1 may be local area networks (LANs), such as one based on Ethernet, Token-Ring or the like. Such network(s) also may be wide-area networks, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
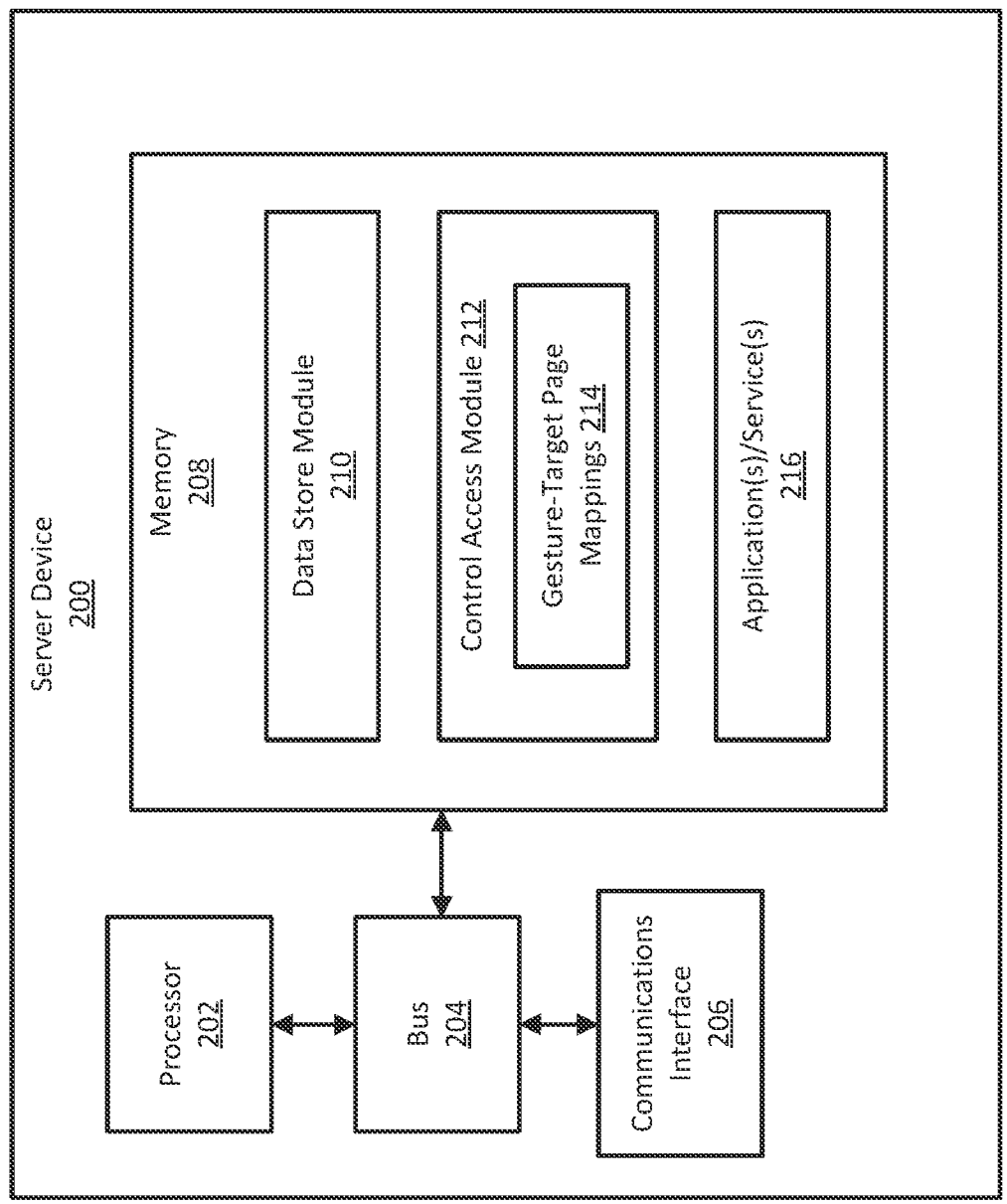
FIG. 2 is a block diagram of an example of a server device configured to execute programming code to authenticate users and provide direct and targeted access to specific pages using gestures, according to one example of the present disclosure.

FIG. 2 is a block diagram of an example of a server device 200 configured to execute programming code to authenticate users and provide direct and targeted access to specific pages using gestures according to one example of the present disclosure. Authenticating users and providing direct and targeted access to specific pages can be based on user-specific mappings between gestures unique to the user and different pages or features within mobile applications or websites. For example, the server device 200 may be used as the server system 110, the authentication server 112, or any combination of servers and systems 112-118 from FIG. 1.

The server device 200 may be a network device and may include a processor 202, a bus 204, a communications interface 206, and a memory 208. In some examples, the components shown in FIG. 2 may be integrated into a single structure. For example, the components can be within a single housing. In other examples, the components shown in FIG. 2 can be distributed (e.g., in separate housings) and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C#, etc.

The communications interface 206 may interface other network devices or network-capable devices to analyze and receive information related to accessing functions of an application. Information received from the communications interface 206 may be sent to the memory 208 via the bus 204. The memory 208 can store any information received from the communications interface 206.

The memory 208 may include program code for authenticating users and providing users with access to the various server resources (e.g., application or web site pages, etc.), based on user-specific mappings between user gestures and different pages/features. The memory 208 may include program code for a data store module 210, and a control access module 212 including a set of gesture-target page mappings 214. Also included in the memory 208 is one or more applications or services 216 that may be used to access data from backend data stores (e.g., data store 120 in FIG. 1) and perform various transactions and system functions. In the example of financial services server, the backend applications or services 216 may perform functions including retrieving and modifying financial account information, transferring information or funds between accounts, etc. The data store module 210 may store user account information (e.g., username and password, security information) for a number of users and client devices 130, including originating IP addresses of login attempts, browser settings of login attempts, etc. The control access module 212 may validate whether a user access attempt has been successfully authenticated after a user has entered the correct account login information. As discussed above, user access attempts may include analyzing and processing user gestures input via a touchscreen or other user interface at the a client device 130, and then comparing the gestures to predefined gesture-target page mappings 214 between specific gestures and target pages (or application features). In some cases, the control access module 212 also may determine the level of authentication that should be applied to a user access attempt, where increased levels of authentication may be desired during higher risk scenarios, etc. The control access module 212 also may determine a threshold level of risk in which a higher level of authentication may be desired. The results from the control access module 212 may be used to control the permissions and functions available to the user from the applications or services 216.

Figure 3:
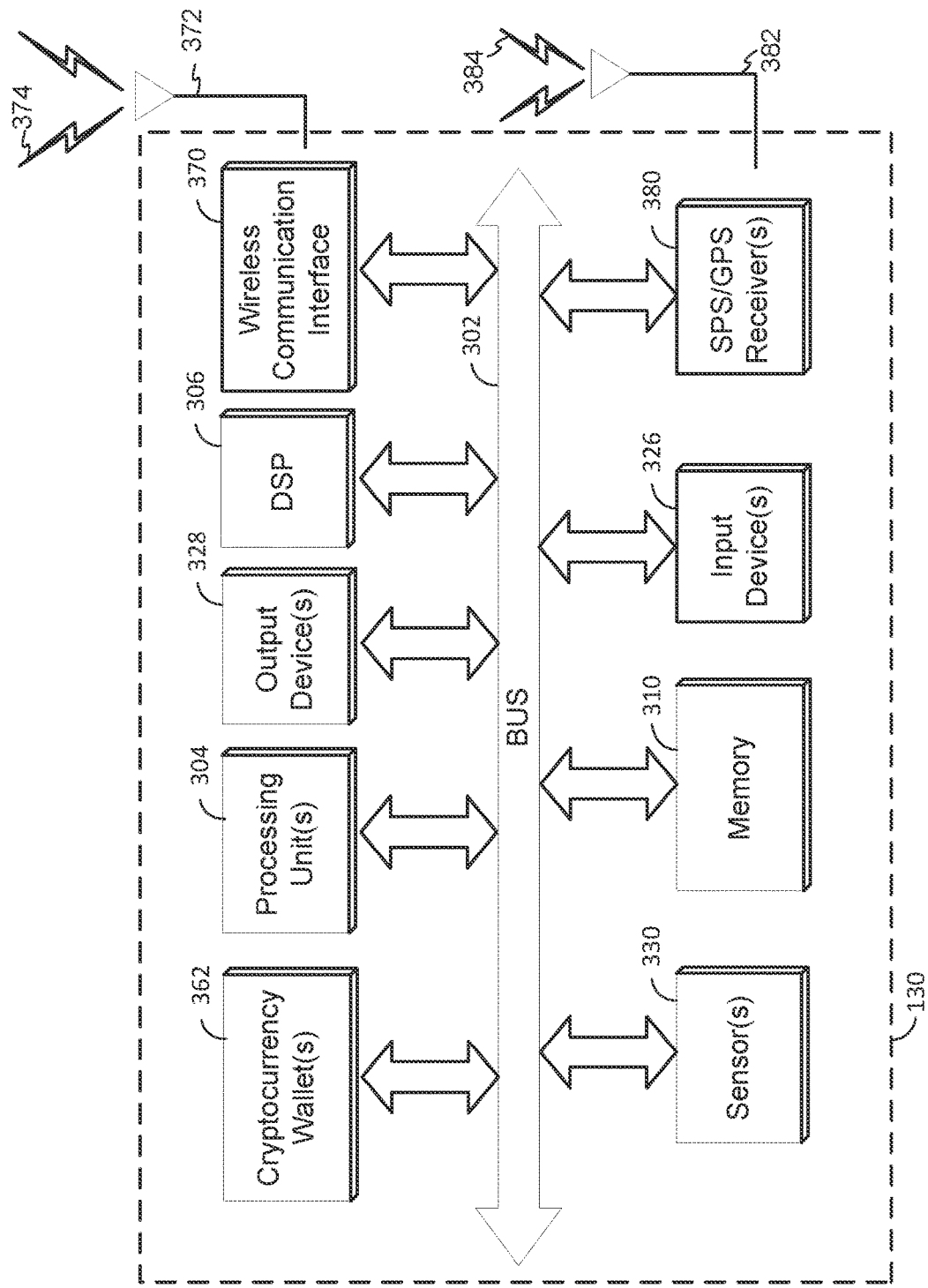
FIG. 3 is a block diagram of a user device usable in a system for authenticating users and providing direct access to pages using gestures according to one example of the present disclosure.

FIG. 3 is a block diagram of a user device 130 usable in a system for authenticating users and providing direct access to pages using gestures according to one example of the present disclosure. As discussed above, user device 130 may include, for example, mobile devices such as smartphones and tablet computers, as well as other various types of user computing devices (e.g., personal computers, laptops, home monitoring/security display devices, weather station displays, digital picture frames, smart watches, wearable computing devices, or vehicle-based display devices). Because the user device 130 may vary widely in functionality, the user device 130 may include a subset of the components shown in FIG. 3. Additionally, in some cases, components illustrated in FIG. 3 may be localized to a single physical device or distributed among various networked devices, which may be disposed at different physical locations.

The user device 130 includes hardware elements that can be electrically coupled via a bus 302 (or may otherwise be in communication, as appropriate). The hardware elements may include a processing unit(s) 304, which may comprise, without limitation, one or more general-purpose processors, one or more special-purpose processors (such as digital signal processing (DSP) chips, graphics acceleration processors, application specific integrated circuits (ASICs), or the like), or other processing structure, which can be configured to perform one or more of the methods described herein. As shown in FIG. 3, some embodiments may have a separate DSP 306, depending on desired functionality. The user device 130 also may include one or more input devices 326, which may be, without limitation, one or more keyboards, mouses, touch screens, touch pads, microphones, buttons, dials, switches, or the like. In some embodiments, users may input specific gestures into the user device 130, for authentication purposes and to request access to a specific page or feature of a mobile application or web site. Accordingly, input devices 326 may include one or more compatible input components that allow the user to input such gestures, including touchscreens, touchpads, styluses, cameras or optical sensors, infrared (IR) sensors, motion sensing remote control devices, and the like. User device 130 also may include one or more output devices 328, which may comprise without limitation, one or more display screens, light emitting diode (LED)s, projectors, speakers, or the like.

User device 130 (e.g., a mobile computing device) may include a touchpad input component for receiving input from the user and may include a wireless communication interface 370, which may comprise without limitation a modem, a network card, an infrared communication device, a wireless communication device, or a chipset (such as a Bluetooth™ device, an IEEE 802.11 device, an IEEE 802.15.4 device, a Wi-Fi™ device, a WiMax™ device, cellular communication facilities, etc.), or the like, which may enable the mobile device 130 to communicate via the networks and servers described above with regard to FIGS. 1-2. The wireless communication interface 370 may permit data to be communicated with a network, wireless access points, wireless base stations, other computer systems, or any other electronic devices described herein. The communication can be carried out via one or more wireless communication antenna(s) 372 that send or receive wireless signals 374.

Depending on desired functionality, the wireless communication interface 370 may comprise separate transceivers to communicate with base stations (e.g., eNBs) and other terrestrial transceivers, such as wireless devices and access points, belonging to or associated with one or more wireless networks. These wireless networks may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax™ (IEEE 802.16) network, and so on. A CDMA network may implement one or more radio access technologies (RATs) such as cdma2000, Wideband CDMA (WCDMA), and so on. Cdma2000 includes IS-95, IS-2000, or IS-856 standards. A TDMA network may implement GSM, Digital Advanced Mobile Phone System (D-AMPS), or some other RAT. An OFDMA network may employ LTE, LTE Advanced, NR and so on. LTE, LTE Advanced, NR, GSM, and WCDMA are described (or being described) in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth™ network, an IEEE 802.15x, or some other type of network. The techniques described herein may also be used for any combination of WWAN, WLAN or WPAN.

The user device 130 may further include sensor(s) 330. Such sensors may comprise, without limitation, one or more accelerometer(s), gyroscope(s), camera(s), magnetometer(s), altimeter(s), microphone(s), proximity sensor(s), light sensor(s), and the like. Some or most of the sensors 330 can be utilized, among other things, for detecting various environmental/contextual data (e.g., sights, sounds, smells, substances, temperatures, etc.) at the location of the user device 130, for obtaining operational status of an appliance or electrical device, or for obtaining other types of data that may be communicated to a backend server.

Certain embodiments of user devices 130 may also include a Standard Positioning Services (SPS) receiver 380 capable of receiving signals 384 from one or more SPS satellites using an SPS antenna 382, which may be combined with antenna(s) 372 in some implementations. Positioning of user devices 130 using SPS receivers 380 may be utilized to complement or incorporate the techniques described herein, and may be used to obtain sensor data by the user device 130. The SPS receiver 380 may support measurement of signals from SPS SVs of an SPS system, such as a GNSS (e.g., Global Positioning System (GPS)), Galileo, GLONASS, Quasi-Zenith Satellite System (QZSS) over Japan, Indian Regional Navigational Satellite System (IRNSS) over India, Beidou over China, or the like. Moreover, the SPS receiver 380 may be used with various augmentation systems (e.g., a Satellite Based Augmentation System (SBAS)) that may be associated with or otherwise enabled for use with one or more global or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), or the like. Thus, as used herein an SPS may include any combination of one or more global or regional navigation satellite systems or augmentation systems, and SPS signals may include SPS, SPS-like, or other signals associated with such one or more SPS.

Additionally, in some embodiments the user device 130 may include a cryptocurrency wallet 362. Cryptocurrency wallet 362 may include one or more executable software components configured to store private and public keys, and to interact with one or more cryptocurrency blockchains, to enable the user device 130 to send and receive digital currency. In some embodiments, one or more types of cryptocurrency may be loaded onto the user device 130, along with predefined instructions or rules specifying when and how the cryptocurrency may be exchanged over time. Additionally or alternatively, a user device 130 may request and receive transfers of cryptocurrency via networks 140 from other user devices 130 or remote systems, via a network service provider or other third-party system.

The user device 130 may further include or be in communication with a 310. The memory 310 may comprise, without limitation, computer-executable instructions, local or network accessible storage, a disk drive, a drive array, an optical storage device, a solid-state storage device, such as a random access memory ("RAM"), or a read-only memory ("ROM"), which can be programmable, flash-updateable, or the like. Such storage devices may be configured to implement any appropriate data stores, including without limitation, various file systems, database structures, or the like. The memory 310 may be used, among other things, to store sensor data received from sensors 330 using a database, linked list, or any other type of data structure. In some embodiments, wireless communication interface 370 may additionally or alternatively comprise memory.

The memory 310 of user device 130 also may comprise software elements (not shown), including an operating system, device drivers, executable libraries, or other code, such as one or more application programs, which may comprise computer programs provided by various embodiments, or may be designed to implement methods, or configure systems, provided by other embodiments, as described herein. Merely by way of example, one or more procedures described with respect to the functionality for user device 130 discussed above might be implemented as code or instructions executable by user device 130 (or a processing unit 304 within the user device 130). Such code or instructions may be used to configure or adapt a general-purpose computer (or other device) to perform one or more operations in accordance with the techniques described herein.

Figure 4:
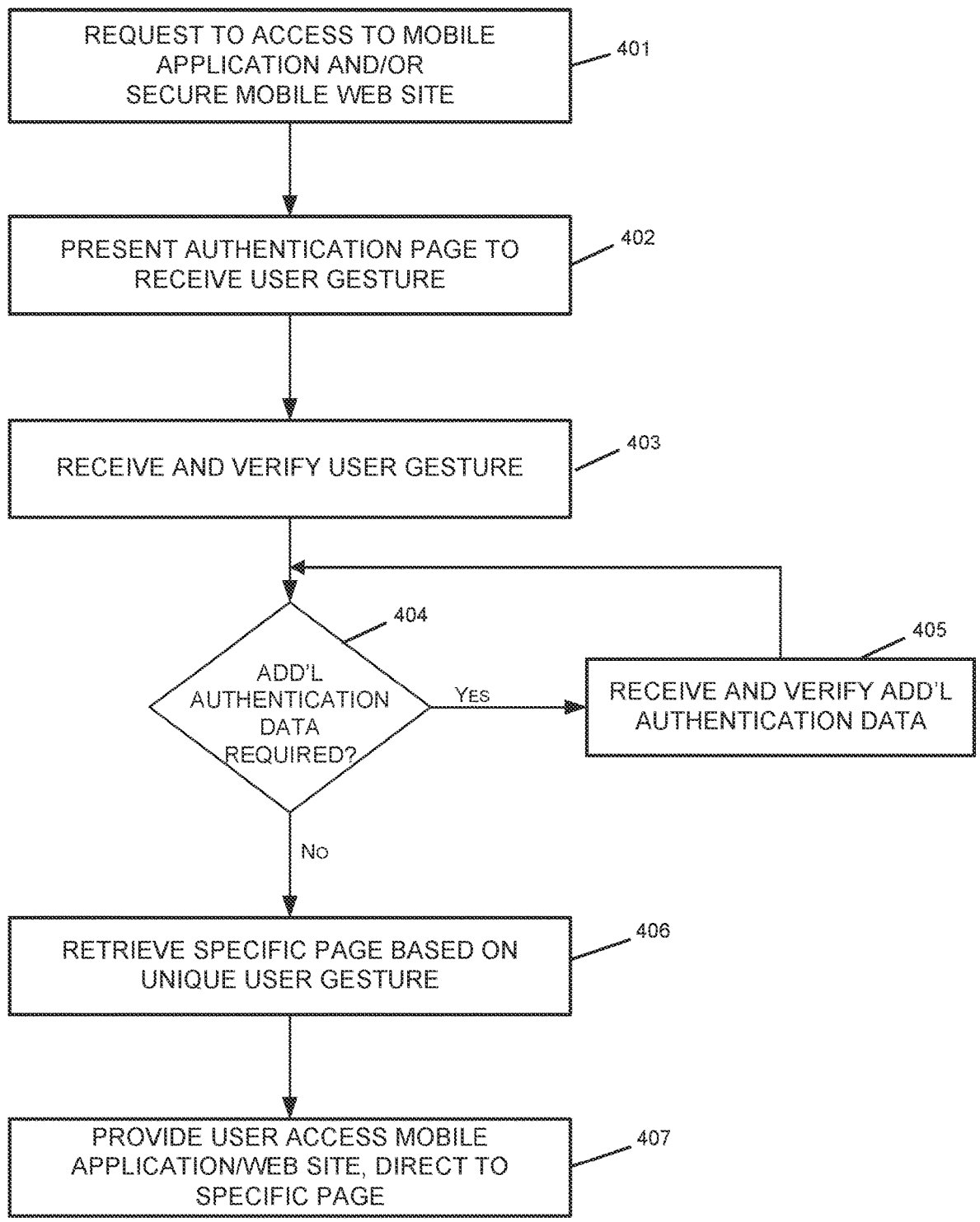
FIG. 4 is a flowchart of a process for performing user authentication or direct access to a specific page or feature within an application or a web site based on a gesture from a user, according to one aspect of the present disclosure.

FIG. 4 is a flowchart of a process 400 for performing user authentication or direct access to a specific page or feature within an application or a web site, based on a gesture from a according to one aspect of the present disclosure. As described below, user-specific mappings of different gestures to different pages within a mobile application or website may be used to more quickly and efficiently authenticate a user and direct the user to their desired page or feature within the mobile application or website. Thus, the examples of user authentication and direct access below may be described in terms of the same computing environments and devices or systems described above in FIGS. 1-3. But, the techniques and steps described below are not limited to the particular computing systems and hardware components described above in reference to FIGS. 1-3, but may be implemented using various other combinations devices and systems to perform the various features and functionality described below.

In block 401, a user operating a user device 130 may request to access certain web resources or applications from a server system 110. In some cases, the request may correspond to a user on a mobile device 130, such as a tablet or smartphone, selecting a mobile application installed on the device 130. For instance, the user may select the installed mobile application to be opened/instantiated on the user device 130, or may select a link within the previously opened mobile application that provides new secure functionality (e.g., logging in to a secure user account or client portal, etc.). Additionally, the request in block 401 need not involve a mobile application, but may correspond to a user attempting to access a secure web site from a web server 114, via a web browser application installed on the device 130, which may occur on mobile or non-mobile computing devices.

In block 402, in response to the request in block 401, the user may be presented with an authentication user interface via a display screen of the user device 130, prompting the user to input a predefined gesture in order to gain access to the selected mobile application or requested web site. In some embodiments, the authentication user interface may prompt the user to provide a written gesture onto a touchpad or touchscreen input of the user device 130. For example, referring briefly to FIG. 5, an example of an authentication user interface is displayed on a user device 130 such as a smartphone or tablet computer for logging into a financial services mobile application. Within this authentication user interface, the user is prompted to input their swipe gesture into the designated field 510, and then select "Go" to login to the mobile application.

The gesture requested in block 402 may be a unique gesture, which may be predefined (e.g., during an account setup process) and pre-stored within the user's device 130 or the server system 110 (e.g., within the authentication server 112), in order to be used like a password or passcode for verifying the user's identity. Because user gestures may be used for authentication purposes, such gestures may be known to the user but not generally known to others for security reasons. Further, as described below, a user may have multiple different predefined gestures, which may differ in type, complexity, etc., and which may be associated with different requested application pages, features, web pages, etc. Each application page included in the application pages may be configured to provide a different set of functional features of the application.

Figure 5:
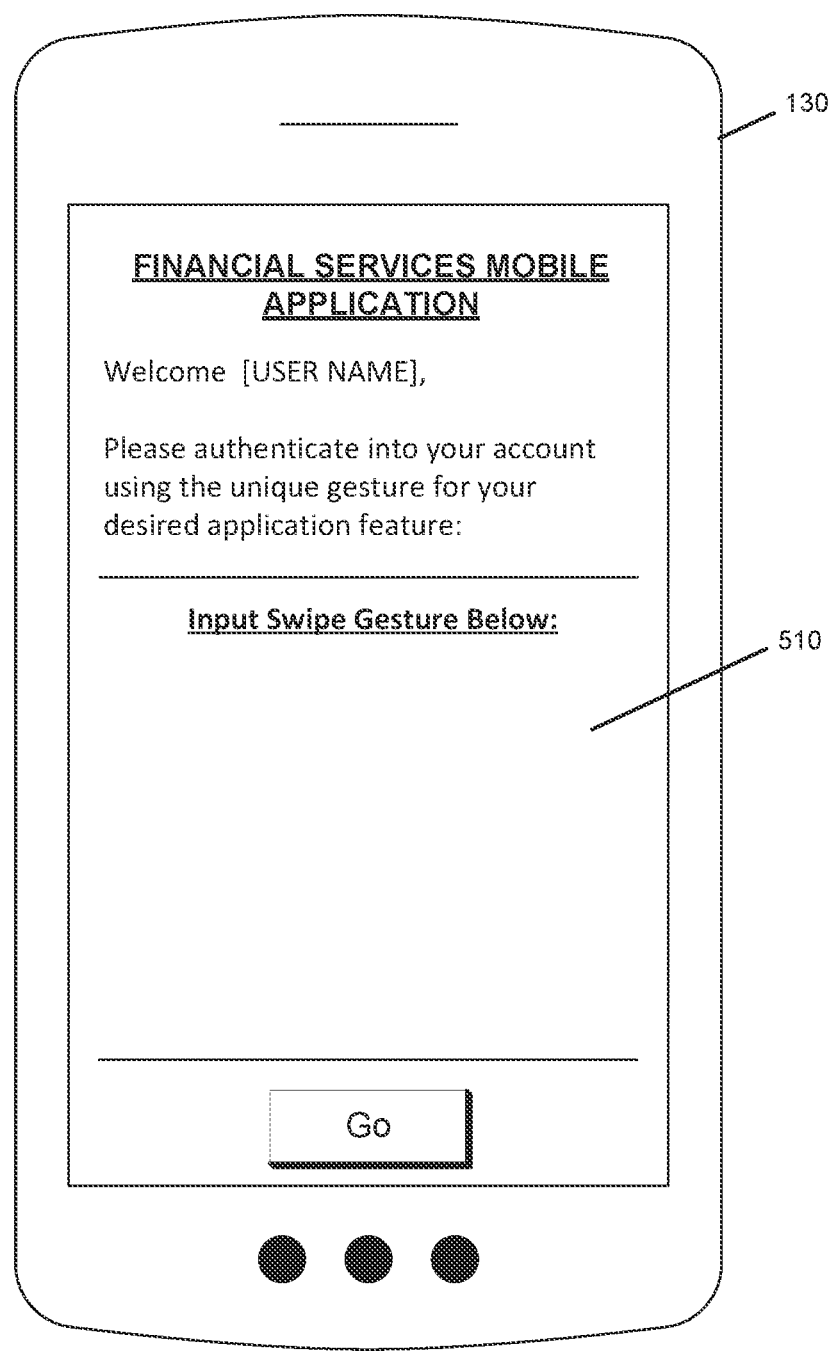
FIG. 5 is an image of a mobile computing device that may be used by a user to input a gesture for providing the user with direct access to specific application pages or features.

In some embodiments, the gesture requested in an authentication user interface may include a "swipe gesture" as shown in FIG. 5. Swipe gestures may refer to gestures written by the user onto a surface (e.g., touchscreen or touchpad), using a finger, stylus, digital pen, or the like. In some cases, a swipe gestures may refer only to those gestures in which the user's finger (or stylus, pen, etc.) stays in contact with the surface throughout the gestures. Other multi-swipe or multi-character gestures may supported in some embodiments, in which the user may be asked to pick up their finger/pen/stylus one or more times while making a gesture.

Additionally, although certain examples described herein relate to swipe gestures and other written gestures, a user gesture may correspond to any physical action taken by the user. For example, other types of gestures that may be supported in various embodiments include various body movements that contain changing behavioral/anatomical information. Such gestures may be full-body gestures, arm gestures or gestures, facial expression gestures, etc., and any combination of these that may be detected by motion detection sensors (e.g., IR sensors), cameras or optical sensors of the user device 130. In some cases, gestures may be provided by the user actuating a handheld motion sensing remote control device, making an air gesture with the device, and then de-actuating the device to single the end of the gesture.

In block 403, the user device 130 may receive and verify the gesture provided by the user in block 402. Gesture verification may include comparing the gesture shape or characteristics to the user's predefined gestures. Additionally, in various embodiments, the gesture verification in block 403 may be performed by the server system 110 (e.g., authentication server 112), the user device 130, or by a combination of client-side and server-side gesture verification techniques. For example, software within the user device 130 (e.g., within the software of the input devices 326 or within the client application software) may convert the gesture into a corresponding data structure with markers and characteristics describing the received gestures. The gesture data structure then may be transmitted to the server system 110 (e.g., authentication server 112) for verification, by comparing the gesture to the user's pre-stored gestures, using one or more similarity thresholds. Assuming the authentication server 112 determines that the user's gesture sufficiently matches the previously stored gestures for that user, the user device 130 may be granted the access to the requested application/resources in accordance with the user's permissions and authorization level. Thus, gesture-based authentication may operate in a similar or identical manner to password/passcode authentication used to grant access to secure applications, web sites, and other resources.

In block 404, the server system 110 (e.g., authentication server 112) or the user device 130 may determine, based on the user gesture verification performed in block 403, whether or not additional authentication data is desired in order to authenticate the user at the user device 130. In some embodiments, depending on the security features implemented for the mobile application, web site, or other resources requested, a user name or account identifier along with a verified gesture may be sufficient (block 404:No) to authenticate the user and grant the user with access to the requested application page, web page, or other backend resources/services. However, in other cases, either due to a higher level of security on the requested resources, or due to a negative or inconclusive gesture verification in block 403 (404:Yes), the user may provide additional authentication data in one or more iterations of blocks 404-405. In some cases, a multi-factor authentication system may be implemented by the server system 110, which may involve verification of a user gesture, as well as one or more other authentication techniques. Additional techniques that may be used in conjunction with user gesture verification may include password verification, challenge questions, and one or more techniques of biometric authentication (e.g., fingerprint identification, retina scanning, iris scanning, facial recognition, ear-recognition technology, voice analysis, etc.).

Although in this example, the various additional authentication data (e.g., passwords, biometrics, etc.) are received and verified in blocks 404-405 after the user's gesture is received and verified in blocks 402-403, it should be understood that these blocks may be performed in different orders in other embodiments. For example, an authentication scheme implemented by an authentication server 112 and client application executing at a user device 130 may first perform one or more authentication factors (e.g., password verification, facial recognition, etc.), and then may collect and verify the user's gesture. A user gesture also may be received and verifying concurrently with other authentication techniques in some examples.

In blocks 406-407, after the user's gesture and the additional user authentication data (if desired) have been received and verified (in blocks 402-405), and the user has been successfully authenticated, then the specific application page or resource requested by the user may be retrieved from the server system 110 in block 406 and provided to the user device in block 407. Thus, as described above, the user may be directed to a specific page or feature/functionality within an application or directed to a specific web page within a web site, etc., based on which gesture was input by the user in block 402.

While the process 400 describes a method for determining the specific application page to present to the user based on the input gesture from the user, more than one gesture may be input into the mobile computing device for determining more than one application page to present to the user. For example, a subsequent gesture, that can be input by the user, may be detected by the server system 110. In response to detecting the subsequent gesture from the user, the server system 110 may determine a second application page or resource, that is different from the specific application page or resource, to present to the user. The server system 110 may access a mapping between the second application page and the corresponding gesture to authenticate the gesture from the user. The server system 110 may transmit the second application page to the user device that may present the second application page to the user via the display screen. The second application page may provide a second set of functional features of the application that is different from the first set of functional features of the application.

Each user may have a predefined set of multiple different gestures, where each gesture may be used to immediately direct the user (e.g., without requiring the user to visit a home page of the application or web site) to a specific page or feature upon logging into and accessing an application or website. For instance, FIGS. 6-9 show several examples of predefined user gestures that may be used both for authenticating the user into a banking/financial services mobile application on their device 130, and also for instantly and automatically directing the user to a specific application page or feature (e.g., rather than the initial home page) when the user is logged in.

Figure 6:
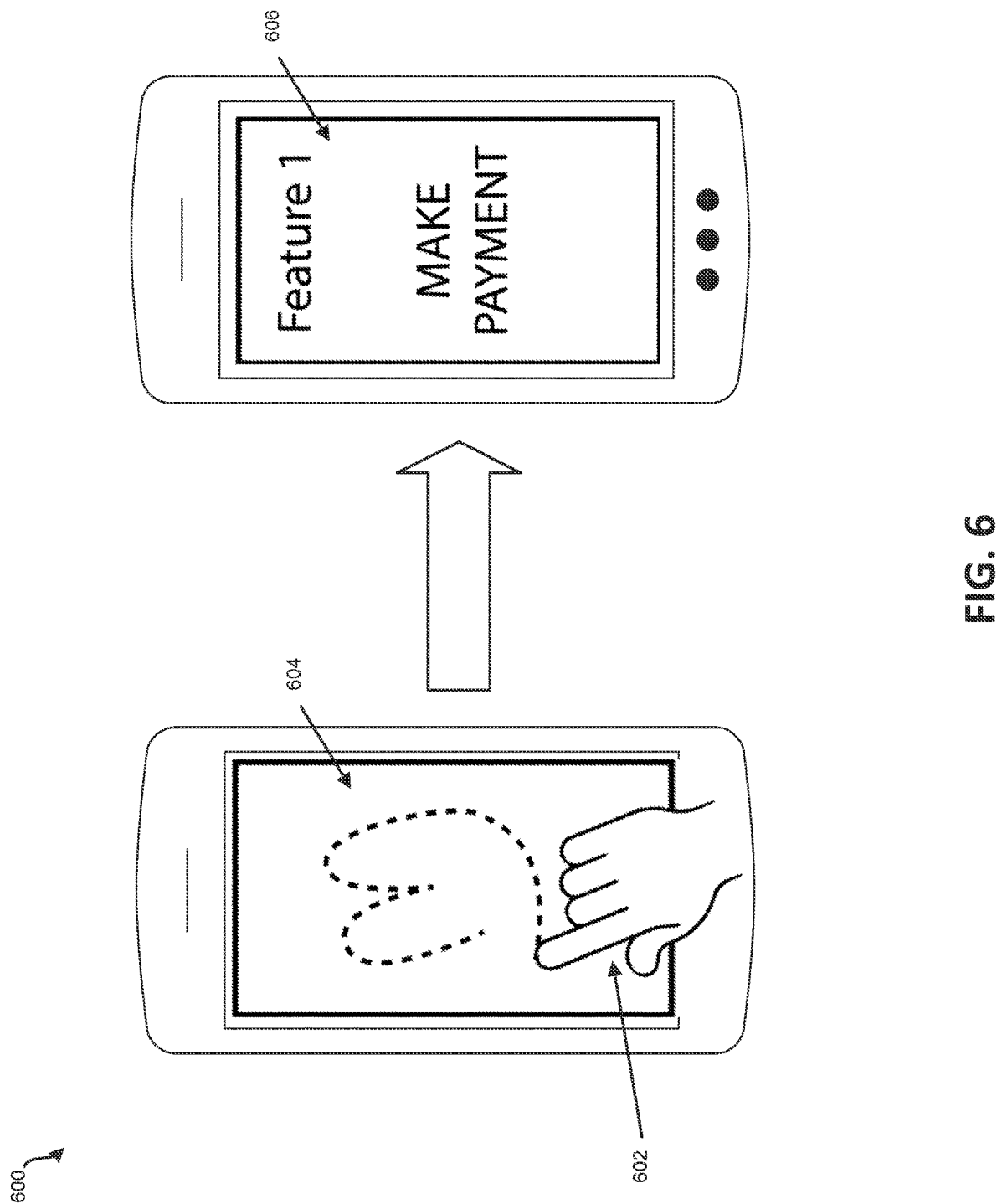
FIG. 6 is an image of an example gesture that a user may define to be used for providing the user with direct access to specific application pages or features.

FIG. 6 is an image 600 of an example gesture that a user 602 may define to be used for providing the user with direct access to specific application pages or features. As shown in FIG. 6, the user 602 may input a first unique gesture 604 to be authenticated and to be logged in. The first unique gesture 604 may automatically direct the user 602 to the "Make Payment" page/feature 606 of the mobile application.

Figure 7:
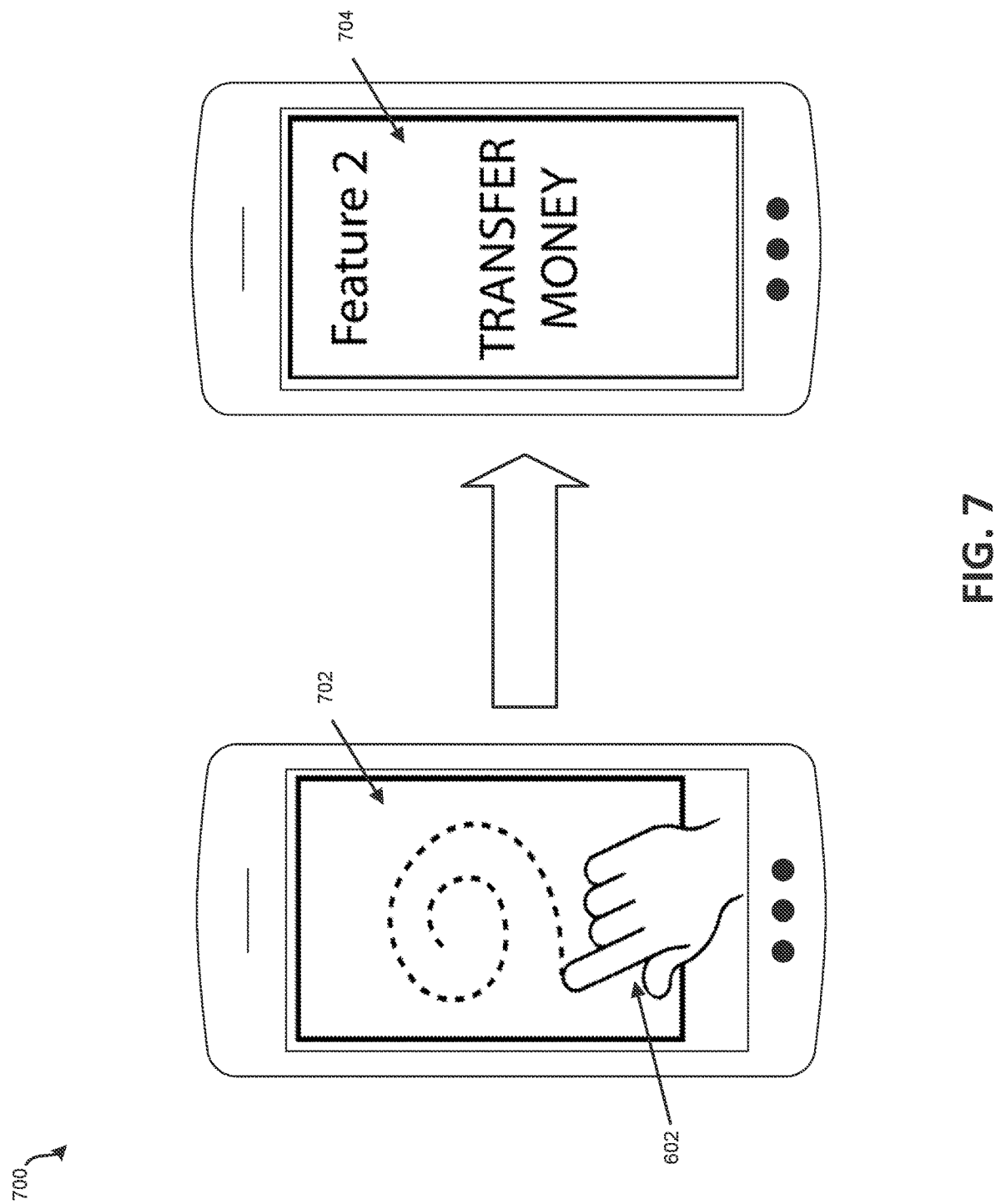
FIG. 7 is an image of an example gesture that a user may define to be used for providing the user with direct access to specific application pages or features.

FIG. 7 is an image 700 of an example gesture that the user 602 may define to be used for providing the user 602 with direct access to specific application pages or features. As shown in FIG. 7, the user 602 may input a second unique gesture 702 to be authenticated and to be logged in. The second unique gesture 702 may automatically direct the user 602 to the "Transfer Money" page/feature 704 of the mobile application.

Figure 8:
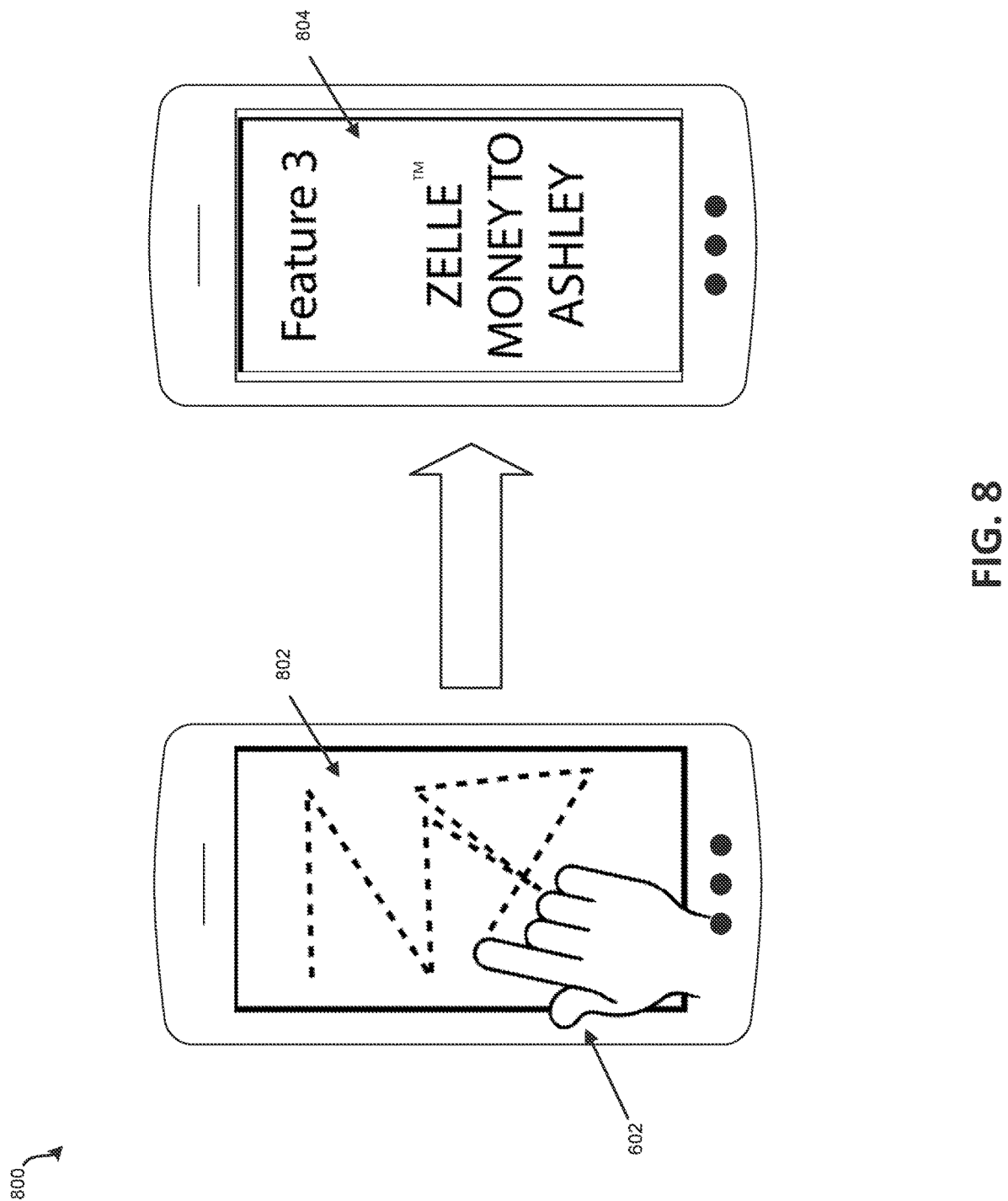
FIG. 8 is an image of an example gesture that a user may define to be used for providing the user with direct access to specific application pages or features.

FIG. 8 is an image 800 of an example gesture that the user 602 may define to be used for providing the user 602 with direct access to specific application pages or features. As shown in FIG. 8, the user 602 may input a third unique gesture 802 to be authenticated and to be logged in. The third unique gesture 802 may automatically direct the user 602 to the "Zelle™ Money" feature 804 of the mobile application, and with the preconfigured recipient of "Ashley," also associated with the third unique gesture 802.

Figure 9:
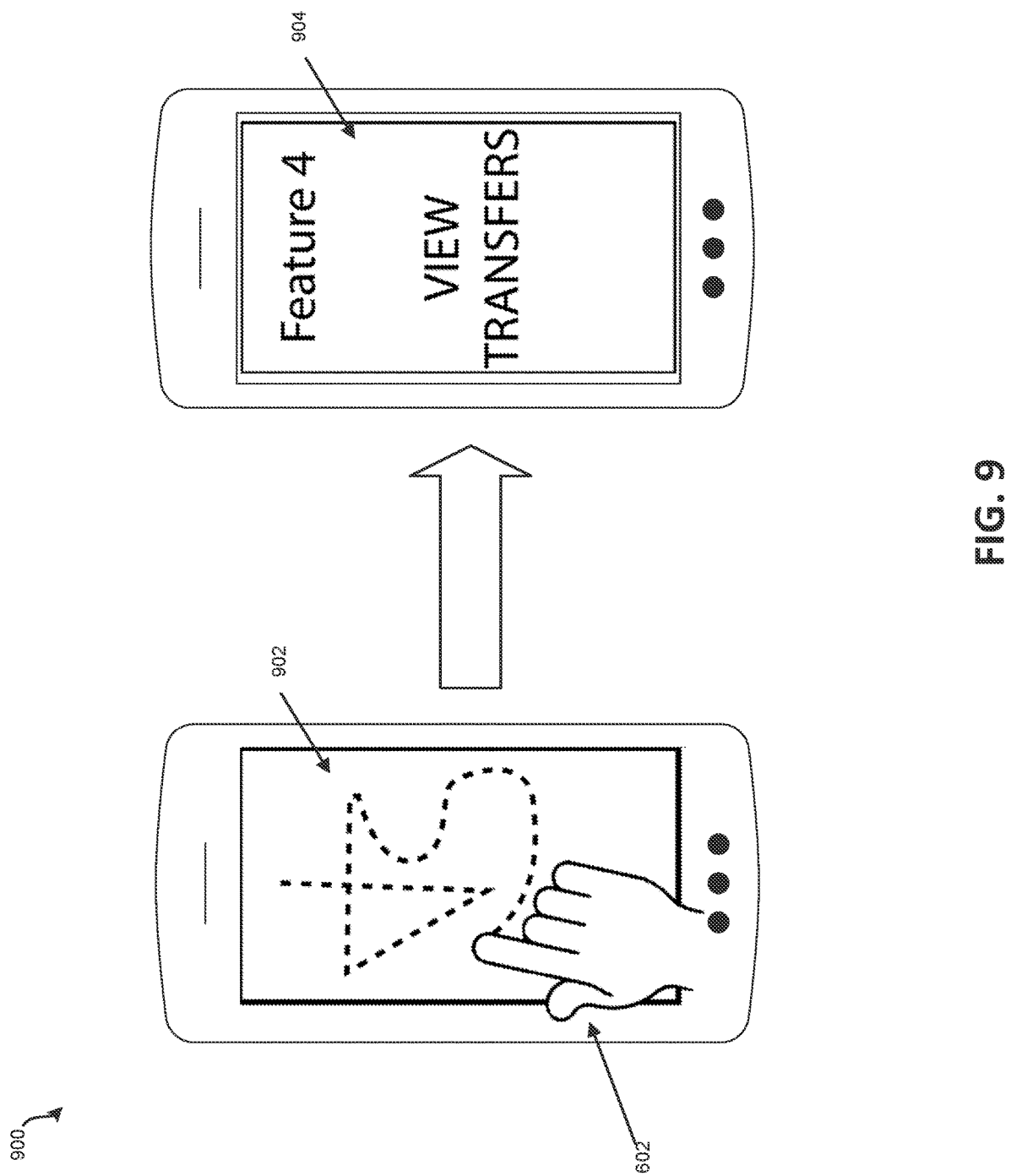
FIG. 9 is an image of an example gesture that a user may define to be used for providing the user with direct access to specific application pages or features.

FIG. 9 is an image 900 of an example gesture that the user 602 may define to be used for providing the user 602 with direct access to specific application pages or features. As shown in FIG. 9, the user 602 may input a fourth unique gesture 902 to be authenticated and to be logged in. The fourth unique gesture 902 may automatically direct the user 602 to the "View Transfers" feature/page 904 of the mobile application.

Although FIGS. 6-9 show four different example of gestures that a user may define to be used for providing the user with direct access to specific application pages or features, it should be understood that there is no maximum to the number of different gestures may be supported for a user in various embodiments. When implemented for a mobile application, as shown in these examples, different gestures may be associated with different pages or user interface screens of the application, or different feature, menu options, etc. As shown in FIG. 8, gestures may be associated not only with specific pages/features of an application, but also with specific recipients, targets, or other configuration data. As another example, a specific user gesture might not only login the user directly to a communication window of an application, but also might automatically populate a message window with predefined recipient(s), subject line, message text, etc. In another example, a specific user gesture might directly login the user to a "View Account" page within the mobile application, but also might automatically select a specific account to be viewed, apply specific views or filters, etc. Thus, specific user gestures described herein may be associated with any mobile application page or feature, along with any combination of user input, selections, filters, etc., that may be selected by the user during an interaction with the mobile application.

As described in the above examples, multiple different user gestures may be predefined and used for authentication (e.g., solely, or combined with other authentication techniques), and also may be used to provide the user with direct access to specific mobile application pages or features, rather than directing the user to the home screen of the mobile application upon logging in. In other examples, multiple different user gestures also may be used to direct a user to a specific web page within a secure web site, rather than directing the user to web site home page automatically upon logging in.

Additionally, it should be understood that the underlying functionality of storing and verifying multiple different user-specific gestures, and using those gestures for authentication or to provide direct access to specific pages or features, may be performed at the server system 110, or within the user device 130, or by a combination of client-server functionality working in collaboration. For example, an authentication server 112 or other backend server may store data representing a user's multiple different gestures (e.g., within gesture-target mapping 214). When receiving an authentication request including a gesture, the authentication server 112 may determine the requested page or feature based on the gesture verification, and may transmit that data to the content provider (e.g., web server or application server) so that the user is immediately directed to the requested page or feature.

However, in other examples, the multiple different user gestures may be stored at the user device 130, and the gesture verification and gesture-to-target mapping may be performed locally at the user device 130. For example, a user gesture to target page (or feature) mapping may be stored in the user device 130, such as with the application memory or in a separate secure memory storing a local user gesture-target. A locally stored gesture-to-target mapping may be stored in addition to or instead of the server side gesture-target mappings 214. When a gesture-to-target mapping is stored locally on the user device 130, the client application may initiate the gesture verification process to determine the user's specific requested page or feature, and then generate and transmit the appropriate request for the specific page or feature to the server system 110.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
    a processing unit including one or more processors; and
    a computer-readable memory comprising instructions that are executable by the processing unit to cause the computing device to:
        receive a request to access an application via the computing device, wherein the application includes a plurality of application pages;
        in response to receiving the request to access the application, output a command to present a user interface via a display screen;
        receive information about a gesture from a user;
        determine a specific application page among the plurality of application pages to present to the user based on the gesture from the user by accessing mappings between the plurality of application pages of the application and corresponding gestures, and by identifying the specific application page as corresponding to the gesture via a mapping;
        output a command to present the specific application page to the user via the display screen, wherein the specific application page is a first application page;
        receive information about a subsequent gesture from the user;
        determine a second application page of the plurality of application pages, that is different from the first application page, to present to the user based on the subsequent gesture from the user by accessing the mappings between the plurality of application pages of the application and the corresponding gestures; and
        output a subsequent command to present the second application page to the user via the display screen.

2. The computing device of claim 1, wherein the computer-readable memory is configured to store the mappings between the plurality of application pages of the application and the corresponding gestures.

3. The computing device of claim 1, wherein the display screen is displayable on a display device that comprises:
    a touchscreen, or touchpad, input component configured to receive the gesture from the user by receiving a first swipe gesture and configured to transmit the first swipe gesture to the computing device.

4. The computing device of claim 1 wherein the computer-readable memory further comprises instructions that are executable by the processing unit to cause the computing device to:
    authenticate the gesture; and
    transmit to a mobile computing device, in response to authenticating the gesture, a confirmation that the user has been successfully authenticated.

5. The computing device of claim 1, wherein the computer-readable memory further comprises instructions executable by the processing unit to cause the computing device to receive at least one of: a password verification, a challenge question verification, or a biometric authentication.

6. The computing device of claim 1, wherein the application is a web-based application, wherein the web-based application is configured to be accessed by a mobile computing device through web-based resources.

7. The computer device of claim 1, wherein the computing device is a computer server configured to control access attempts to a set of network resources or services.

8. A non-transitory computer-readable medium comprising instructions that are executable by a processor for performing operations, the operations comprising:
receiving a request to access an application, wherein the application includes a plurality of application pages;
in response to receiving the request to access the application, outputting a command to present a user interface via a display screen;
receiving information about a gesture from a user;
determining a specific application page among the plurality of application pages to present to the user based on the gesture from the user by accessing mappings between the plurality of application pages of the application and corresponding gestures, and by identifying the specific application page as corresponding to the gesture via a mapping;
outputting a command to present the specific application page to the user via the display screen, wherein the specific application page is a first application page;
receiving information about a subsequent gesture from the user;
determining a second application page of the plurality of application pages, that is different from the first application page, to present to the user based on the subsequent gesture from the user by accessing the mappings between the plurality of application pages of the application and the corresponding gestures; and
outputting a subsequent command to present the second application page to the user via the display screen.

9. The non-transitory computer-readable medium of claim 8, comprising the mappings between the plurality of application pages of the application and the corresponding gestures.

10. The non-transitory computer-readable medium of claim 8, wherein the display screen is displayable on a display device that comprises:
a touchscreen, or touchpad, input component configured to receive the gesture from the user by receiving a first swipe gesture and configured to transmit the information about the first swipe gesture.

11. The non-transitory computer-readable medium of claim 8, wherein the operations further comprise:
authenticating the gesture; and
transmitting to a mobile computing device, in response to authenticating the gesture, a confirmation that the user has been successfully authenticated.

12. The non-transitory computer-readable medium of claim 8, wherein the operations further comprise:
receiving at least one of: a password verification, a challenge question verification, or a biometric authentication.

13. The non-transitory computer-readable medium of claim 8, wherein the application is a web-based application, wherein the web-based application is configured to be accessed by a mobile computing device through web-based resources.

14. A method comprising:
receiving a request to access an application, wherein the application includes a plurality of application pages;
in response to receiving the request to access the application, outputting a command to present a user interface via a display screen;
receiving information about a gesture from a user;
determining a specific application page among the plurality of application pages to present to the user based on the gesture from the user;
outputting a command to present the specific application page to the user via the display screen, wherein the specific application page is a first application page;
receiving information about a subsequent gesture from the user;
determining a second application page of the plurality of application pages, that is different from the first application page, to present to the user based on the subsequent gesture from the user; and
outputting a subsequent command to present the second application page to the user via the display screen.

15. The method of claim 14, further comprising receiving, from a mobile computing device, at least one of: a password verification, a challenge question verification, or a biometric authentication.

16. The method of claim 14, further comprising: storing mappings between the plurality of application pages of the application and corresponding gestures.

17. The method of claim 16, wherein determining the specific application page of the plurality of application pages to present to the user based on the gesture from the user comprises accessing the mappings between the plurality of application pages of the application and corresponding gestures.

18. The method of claim 14, wherein the display screen is displayable on a display device that comprises:
a touchscreen, or touchpad, input component configured to receive the gesture from the user by receiving a first swipe gesture and configured to transmit the information about the first swipe gesture.

19. The method of claim 14, further comprising:
authenticating the gesture; and
transmitting to a mobile computing device, in response to authenticating the gesture, a confirmation that the user has been successfully authenticated.

20. The method of claim 14, further comprising:
receiving at least one of: a password verification, a challenge question verification, or a biometric authentication.

\* \* \* \* \*